US012590529B2

(12) United States Patent
Noufal et al.

(10) Patent No.: US 12,590,529 B2
(45) Date of Patent: Mar. 31, 2026

(54) BOREHOLE IMAGE INTERPRETATION AND ANALYSIS

(71) Applicant: MATRIX JVCO LTD, Abu Dhabi (AE)

(72) Inventors: Abdelwahab Noufal, Abu Dhabi (AE); Abed Benaichouche, Abu Dhabi (AE); Rachid Belmeskine, Abu Dhabi (AE); Mohamed Amri, Abu Dhabi (AE)

(73) Assignee: MATRIX JVCO LTD, Abu Dhabi (AE)

( * ) Notice: Subject to any disclaimer, the term of this patent is extended or adjusted under 35 U.S.C. 154(b) by 533 days.

(21) Appl. No.: 18/000,596

(22) PCT Filed: Jun. 2, 2021

(86) PCT No.: PCT/IB2021/054819
§ 371 (c)(1),
(2) Date: Dec. 2, 2022

(87) PCT Pub. No.: WO2021/245563
PCT Pub. Date: Dec. 9, 2021

(65) Prior Publication Data
US 2023/0332495 A1     Oct. 19, 2023

Related U.S. Application Data

(60) Provisional application No. 63/033,418, filed on Jun. 2, 2020.

(51) Int. Cl.
*E21B 47/002* (2012.01)
*E21B 47/085* (2012.01)
(Continued)

(52) U.S. Cl.
CPC ........ *E21B 47/0025* (2020.05); *E21B 47/085* (2020.05); *G06T 7/11* (2017.01);
(Continued)

(58) Field of Classification Search
CPC ...... E21B 47/0025; E21B 47/085; G06T 7/11; G06T 7/251; G06T 2207/20081;
(Continued)

(56) References Cited

U.S. PATENT DOCUMENTS 4,962,490 A 10/1990 Lyle et al.
5,970,371 A 10/1999 Hsieh et al.
(Continued)

FOREIGN PATENT DOCUMENTS

AU        2013101491 A4 * 2/2014
WO    WO-2010059263 A1 * 5/2010 ............... G01V 3/26
(Continued)

OTHER PUBLICATIONS

Belmeskine, R. et al. "Inpainting borehole images using Generative Adversarial Networks" Computer Vision and Pattern Recognition Jan. 15, 2023, pp. 1-4 (Year: 2023).*
(Continued)

*Primary Examiner* — Mia M Thomas
(74) *Attorney, Agent, or Firm* — Renner, Otto, Boisselle & Sklar, LLP

(57) ABSTRACT

Computer vision system and method for detecting and characterizing heterogeneities from a representation of a borehole. A memory stores processor-executable modules executed by a computer vision processor. The modules include a preprocessing module to extract a plurality of borehole images from the representation of the borehole, a computer vision module to perform semantic segmentation for automated classification of pixels in the borehole images to identify the heterogeneities, and a characterization module to execute a fitting algorithm for extracting dimensional information of the identified heterogeneities.

16 Claims, 7 Drawing Sheets

(51) Int. Cl.
   *G06T 7/11* (2017.01)
   *G06T 7/246* (2017.01)
(52) U.S. Cl.
   CPC .... *G06T 7/251* (2017.01); *G06T 2207/20081* (2013.01); *G06T 2207/30181* (2013.01)
(58) Field of Classification Search
   CPC ............. G06T 2207/30181; G06T 7/41; G06T 2207/20084; G06T 7/0004; G06N 3/045; G06N 3/047; G06V 10/26; G06V 10/764; G06V 10/82; G06V 20/70; G06V 10/471; G01V 1/46; G01V 1/50; G01V 2210/6244; G01V 2210/646
   See application file for complete search history.

(56) References Cited

U.S. PATENT DOCUMENTS

| | | | | |
|---|---|---|---|---|
| 9,977,996 | B2 * | 5/2018 | Yamada | G06F 18/24 |
| 10,429,527 | B2 * | 10/2019 | Ascough | G06F 17/13 |
| 10,991,078 | B2 * | 4/2021 | Hakimuddin | G06F 18/24 |
| 11,995,791 | B2 * | 5/2024 | Ma | G06T 5/77 |
| 2009/0055097 | A1 * | 2/2009 | Kowalik | E21B 47/002 |
| | | | | 702/6 |
| 2011/0282583 | A1 * | 11/2011 | Clark | E21B 47/0228 |
| | | | | 702/6 |
| 2013/0279752 | A1 | 10/2013 | Thomas et al. | |
| 2014/0177947 | A1 | 6/2014 | Krizhevsky et al. | |
| 2016/0032717 | A1 * | 2/2016 | Parker | E21B 47/12 |
| | | | | 324/369 |
| 2016/0307066 | A1 * | 10/2016 | Akama | G06T 7/73 |
| 2017/0178313 | A1 * | 6/2017 | Yang | G01N 15/1433 |
| 2017/0372490 | A1 | 12/2017 | Kherroubi et al. | |
| 2020/0264327 | A1 * | 8/2020 | Gadylshin | G06T 5/77 |
| 2021/0063560 | A1 * | 3/2021 | Bosse | G01S 13/93 |
| 2021/0225070 | A1 * | 7/2021 | Al-Nasser | G01V 20/00 |
| 2021/0356615 | A1 * | 11/2021 | Nguyen | E21B 47/026 |
| 2023/0036713 | A1 * | 2/2023 | Pattnaik | G06T 5/60 |
| 2023/0122264 | A1 * | 4/2023 | Ruel | G01N 15/1429 |
| | | | | 382/103 |
| 2023/0245278 | A1 * | 8/2023 | Guner | G06T 5/77 |
| | | | | 382/275 |
| 2024/0368980 | A1 * | 11/2024 | Alrumaih | G06V 10/764 |

FOREIGN PATENT DOCUMENTS

| | | | |
|---|---|---|---|
| WO | 2014070572 | A2 | 5/2014 |
| WO | 2014200996 | A2 | 12/2014 |

OTHER PUBLICATIONS

Zhao-Hui, Z. et al. "Self-adaptively inpainting gaps between electrical image pads according to the image fabric" Applied Geophysics, vol. 17, No. 5-6 (Dec. 2020), p. 823-833, 7 Figures (Year: 2020).*

Moran, M. et al. "Automatic Sinusoidal Curves Detection in Borehole Images Using the Iterated Local Search Algorithm" Proceedings of the IWSSIP 2020—Main Track Paper, pp. 1-6. (Year: 2020).*

Cheng, Y. "A borehole image dataset for the intelligent identification of structural planes" Results in Engineering vol. 27, Sep. 2025, 106419, pp. 1-15 (Year: 2025).*

Assous, S. et al. "Automated detection of planar geologic features in borehole images" Geophysics Journal, Nov. 2013, pp. 1-36 (Year: 2013).*

Cheng, Y. et al. "A borehole image dataset for the intelligent identification of structural planes" Results in Engineering 27 (2025) 106419, pp. 1-15 https://doi.org/10.1016/j.rineng.2025.106419 (Year: 2025).*

Fornero, S. et al. "Application of borehole images in the characterization of volcanic paleoenvironments with implications for the exploration of hydrocarbons in Brazilian basins" Petroleum Exploration and Development vol. 52, Issue 3, Jun. 2025, pp. 692-714 (Year: 2025).*

Wang, J. et al. "Fine detection technology of rock mass structure based on borehole acousto-optic combined measurement" Measurement 187 (2022) 110259, pp. 1-19 (Year: 2022).*

Czimmermann, T. et al.. "Visual-Based Defect Detection and Classification Approaches for Industrial Applications—A Survey" Sensors. 2020; 20(5):1459, pp. 1-25 (Year: 2020).*

International Search Report and Written Opinion of the International Searching Authority for corresponding International Patent Application No. PCT/IB2021/054819, mailed Aug. 23, 2021.

Karimpouli et al., "Coal Cleat/Fracture Segmentation Using Convolutional Neural Networks," Natural Resources Research, Aug. 6, 2019, vol. 29, pp. 1-11.

Elharrouss et al., "Image Inpainting: a Review, Neural Processing Letters," Dec. 6, 2019, vol. 51, pp. 1-22.

Li, X. et al., "Automatic fracture-vug identification and extraction from electric imaging logging data based on path morphology," Petroleum Science, 2019.

Jos B.T.M. Roerdink et al. "The watershed transform: definitions, algorithms and parallelization strategies," Fundam. Inform, 2000.

I. Goodfellow, J. Pouget-Abadie, M. Mirza, B. Xu, D. Warde-Farley, S. Ozair, A. Courville, and Y. Bengio. "Generative adversarial nets, In Advances in neural information processing systems," pp. 2672-2680, 2014.

Yann LeCun et al., "Deep learning," Nature, 521, pp. 436-444, 2015.

Alex Krizhevsky et al.,"Imagenet classification with deep convolutional neural networks," in Advances in neural Information processing systems, 2012.

Jia Deng et al., "Imagenet: a large-scale hierarchical image database," in CVPR 2009., 2009.

Angelier, J., "Determination of the mean principal directions of stresses for a given fault population," Tectonophysics, 56(3-4), T17-T26, 1979.

Huang, Q., & Charlesworth, H., "A FORTRAN-77 program to separate a heterogeneous set of orientations into subsets," Computers & Geosciences, 15(1), 1-7, 1989.

Yamada, T., et al. Revisiting Porosity Analysis From Electrical Borehole Images: Integration of Advanced Texture and Porosity Analysis. SPWLA 54th Annual Logging Symposium, Jun. 22-26, New Orleans, 2013.

Gupta, K.D. et al., "A Deep-Learning approach for borehole image interpretation. SPWLA 60th Annual Logging Symposium," Jun. 17-19, The Woodlands, 2019.

Turner, F. J., "Nature and dynamic interpretation of deformation lamellae in calcite of three marbles. American Journal of Science," 251(4), 276-298, 1953.

Lisle, R. J., "ROMSA: a BASIC program for paleostress analysis using fault-striation data," Computers & Geosciences, 14(2), 255-259, 1988.

Spang, J. H., "Numerical method for dynamic analysis of calcite twin lamellae," Geological Society of America Bulletin, 33(2), 467-472, 1972.

International Preliminary Report on Patentability of the International Examining Authority issued for corresponding International Patent Application No. PCT/IB2021/054819, mailed Sep. 19, 2022.

Spang, J. H., "Numerical method for dynamic analysis of calcite twin lamellae," Geological Society of America Bulletin, 83(2), 467-472, 1972.

Mirkes Evgeny M et al: "Pseudo—outcrop Visualization of Borehole Images and Core Scans", Mathematical Geosciences, Springer Berlin Heidelberg, Berlin/Heidelberg, vol. 49, No. 8, Sep. 11, 2017 ( Sep. 11, 2017), pp. 947-964.

Taibi Fatemeh et al: " Robust reservoir rock fracture recognition based on a new sparse feature learning and data training method", Multidimensional Systems and Signal Processing, Springer US, Boston, vol. 30, No. 4, Apr. 9, 2019 (Apr. 9, 2019), pp. 2113-2146.

Extended European Search Report issued for corresponding European Patent Application No. EP 21818829.0, mailed May 28, 2024.

Wang Chuanying et al: "An automatic recognition and parameter extraction method for structural planes in borehoie image", Journal

(56) References Cited

OTHER PUBLICATIONS of Applied Geophysics, Elsevier, Amsterdam, NL, vol. 135, Oct. 4, 2016 (Oct. 4, 2016), pp. 135-143, XP029837095, ISSN: 0926-9851 , DOI: 10.1 01 6/J.JAPPGEO.201 6.1 0.005.
First European Examination Report issued in corresponding EP Application No. 21818829.0 mailed Jun. 24, 2025.

* cited by examiner

BOREHOLE IMAGE INTERPRETATION AND ANALYSIS

CROSS REFERENCE TO RELATED APPLICATION

This application is a national phase of International Application No. PCT/IB2021/054819, filed Jun. 2, 2021, which claims priority from U.S. Provisional Patent Application No. 63/033,418, filed Jun. 2, 2020, the entire disclosure of which is incorporated herein by reference.

FIELD

Aspects of the present invention relate to a supervised-learning technique for borehole image interpretation to automatically detect and classify geological features from borehole images and more particularly to a workflow, based on machine learning and supervised computer vision, where annotation of visible features from borehole images are used for training a model for automatic predictions for unseen wellbores, or portions thereof.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Borehole image interpretation aims to evaluate the geological features, especially the structural features by interpreting the feature's orientation detected along the borehole and to classify them. Manual interpretation of borehole images can be time consuming and is sometimes affected by inconsistencies stemming from the different interpretation approaches used. Thus, there is a need for a robust automatic or semiautomatic approach to reduce the manual labor and increase efficiency and consistency.

Borehole images generated from micro-resistivity logs have been extensively used by experienced geologists to gather information about small-scale heterogeneous geological features surrounding a well. Conventional logs are characterized by a low resolution (above 1 ft), and in most cases azimuthal directionality, which can give misleading information when geological features do not cover the entire well perimeter, as for instance vugs, caverns, and drilling induced features. On the other hand, microelectrical images have a typical resolution of 5.08 mm (0.2 in) and azimuthal coverage, which make them suitable to detect and characterize any heterogeneity immersed in the formation. See Yamada, T., et al. Revisiting Porosity Analysis From Electrical Borehole Images: Integration of Advanced Texture and Porosity Analysis. SPWLA 54th Annual Logging Symposium, 22-26 June, New Orleans, 2013. A borehole image consists of a bi-dimensional map, along the well depth and the azimuth orientation, in which variations in pixel intensities are correlated to local porosity and permeability: in a water-based mud borehole image a dense phase corresponds to high intensity pixels, while a porous phase to low intensity pixels. Often, because of the spatial arrangement of the measuring sensors, the micro-resistivity logger does not provide full coverage of the well perimeter, which produces vertical white stripes in which borehole pixels are missing.

The porosity observed in borehole images is typically macro-porosity related to heterogeneous geological features produced either by tectonic events (fractures and faults), diagenesis and dissolution (vugs, stylolites, solution enhanced bed boundaries), or artificial events (drilling induced fractures, breakouts, washouts). All these features can be distinguished by the eye of an expert geologist who is able to firstly recognise them, and then extract salient characteristics that are significant for hydrocarbon recovery. Since this process is time consuming and repetitive, recent success from the deep learning community in automating computer vision tasks at human level performance, would make borehole analytics a good candidate for artificial intelligence applications. This approach becomes even more beneficial if the automated analysis includes also subsequent steps of the characterization workflow, such as porosity, connectivity, and geomechanical analysis.

However, borehole image analytics is significantly more difficult compared to its traditional image counterpart for several reasons. Firstly, the image quality is much lower in terms of resolution and sharpness of the contours, misalignments between different pads of the microelectrical logger, and intensity artefacts generated by non-uniform conductive fluid coverage. Secondly, the images are at gray scale, which prevents using colour based information contained in RGB images. Finally, the lack of any similar datasets makes the use of pretrained models or transfer learning techniques, which have been key for success of deep learning applications, substantially ineffective.

For all the reasons above, until very recently all the attempts of automated borehole image analytics have involved rule-based unsupervised techniques. One type of unsupervised approaches which involve image segmentation is described in Yamada et al., together with an historical evolution in the references within it, to separate primary from secondary porosity, and connected from isolated heterogeneities. A different approach based in mathematical morphology is described in Li, et al., in which morphological operators where designed to separate vugs from sinusoidal fractures. See Li, X. et al. Automatic fracture-vug identification and extraction from electric imaging logging data based on path morphology. Petroleum Science, 2019. Unsupervised methods have a common limitation in that they all require a cut-off intensity threshold to separate matrix from heterogeneities, which varies with the well bore depth, and that given the variable image quality cannot be defined consistently.

Recently a supervised deep learning approach has been described in which a fully convolutional network architecture is used to detect drilling induced and sedimentary surfaces, although performance metrics have not been reported (Gupta, et al.). See Gupta, K. D et al. A Deep-Learning approach for borehole image interpretation. SPWLA 60th Annual Logging Symposium, 17-19 June, The Woodlands, 2019. Within this technique an expert geologist delineates a curve on top every feature and a model is trained to reproduce the feature profile at inference stage. The main limitation of this method is that borehole heterogeneities often cannot be represented as a curve either because they have a bi-dimensional shape (vugs and breakouts), or they overlap and intersect with each other (fractures and bed boundary), and also because it is fundamental to characterize the thickness of features as well as their profile.

Imputation of missing data in vertical gaps produced by the instrument has been previously done through statistical methods using a filter that describes the local variability of pixel intensity patterns across the image. See Gelman, A. et al. Borehole Gap Filling. Patent WO 2014/200996 A2. On the opposite side, an alternative method based on Fourier space image representation is described in Li, et al. 2, which is able to reproduce the overall texture of the image.

Unsupervised segmentation of heterogeneities in a borehole image has been shown in Yamada et al., in which the authors develop a methodology to firstly segment an image into macro-pixels using a technique called Watershed Segmentation, and subsequently to separate the pixels into primary and secondary porosity according to an intensity threshold based on the histogram of pixel intensity. See Yamada et al. Characterizing porosity distribution from a borehole image. U.S. Pat. No. 9,977,996 B2; Jos B. T. et al. The watershed transform: definitions, algorithms and parallelization strategies. Fundam. Inform. 2000. The connectivity of these macro-pixels was computed by comparing the intensity of crest lines of the watershed and an estimated intensity of the matrix. In this way porosity from heterogeneities was further classified into connected and isolated. The final output was a quantification of primary and secondary porosity along the well, as well as the connectivity of secondary porosity. The author claimed that especially the latter metrics would give important indication for optimal oil recovery strategies.

Automated extraction of planar heterogeneities orientation has been done in Kherroubi et al. by applying the Hough transform, in which curvilinear features are defined in a parametric space which is used to accumulate pixels belonging to sinusoidal curves. See Kherroubi et al. Automated dip picking in borehole images. Patent US 2017/0372490 A1. A voting system is then used to establish if groups of pixels are arranged along a well-defined sinusoidal pattern, and subsequently to extract sinusoids. From the sinusoids geometrical transformations are applied to estimate the dip and strike angles that describe the orientation of geological surfaces.

The invention is aimed at undertaking fully automated AI analytics of microelectrical borehole images with at least the same level of accuracy of an experienced human geologist. Borehole analytics is carried by an expert in two steps. Firstly, geological heterogeneities which are relevant from the analysis are extracted, and secondly, every heterogeneity is processed to compute hydrocarbon recovery significant metrics such as porosity, permeability, connectivity, and geomechanical stress/strain conditions. Borehole images may have several vertical stripes in which, due to the configuration of the measuring sensors, data is missing. In the latter case, it might be needed to fill the gaps through numerical techniques. Given borehole grayscale images the tool is required to segment (or extract) pixel regions belonging to different geological heterogeneities, and to recognize them among different heterogeneity classes such as bed boundaries, natural fractures, vugs, and drilling induced. This problem is particularly challenging also for a human expert for several reasons: (i) the image resolution and noise makes it difficult to outline the contour of heterogeneities, (ii) some of the heterogeneity classes may have only subtle differences, for example a discontinuous fracture vs. a drilling induced fracture, (iii) non-uniform thickness of conductive fluid or out-of-centre tool positioning creates zone of artificially low intensity due to a local increase of current flow, (iv) instrumental errors may change the appearance of heterogeneities compare to ideal reference examples, and (v) multiple vertical measurement gaps prevent visualization of the full heterogeneity profile.

Once extracted and classified, meaningful characterization of heterogeneities is equally difficult. Planar surfaces, such as bed boundaries, reflect into near to sinusoidal profiles in a boreholes images which need to be thoroughly processed to calculate their orientation in terms of dip and strike angles. Because of contour irregularity, the quality of images, and feature proximity or overlapping, computer vision standard techniques would typically fail in most of the cases. A similar concept applies to geomechanical analysis which also relies on orientation and distribution of fractures. Finally, porosity, permeability and connectivity analysis require algorithms which are able to process information carried by the pixel intensity map in a physically consistent way that agrees with standard measurements from conventional logs and core analysis.

SUMMARY

The various embodiments detailed herein relate to a method, system and computer program product for borehole image interpretation analysis. More particularly the various embodiments detailed herein relate to a supervised-learning technique to automatically detect and classify geological features from borehole images.

In accordance with one or more embodiments of the present invention, an improved workflow is described as a core component for a system that can take borehole images, use Generative Adversarial Network to fill the gaps caused by the logging tool pads, automatically identify heterogeneities that can be observed on a borehole image including geological related features and drilling related features, determine apparent/true dip and azimuth of each feature, use the segmented image and the borehole image to calculate image porosity and image permeability, and use the true dip and azimuth to perform stress analysis.

Although automatic dip picking systems exist in other applications, this is the first application to use supervised computer vision to identify heterogeneities in borehole images after training a deep neural network based on manually annotated images. In addition, new pipelines are used for sinusoids and polygons fitting contrarily to the conventional Hough transform algorithms.

The porosity observed in borehole images is typically macro-porosity related to heterogeneous geological features produced either by tectonic events (fractures and faults), diagenesis and dissolution (vugs, stylolites, solution enhanced bed boundaries), or artificial events (drilling induced fractures, breakouts, washouts). All these features can be distinguished by the eye of an expert geologist who is able to firstly recognise them, and then extract salient characteristics that are significant for hydrocarbon recovery. Since this process is time consuming and repetitive, recent success from the deep learning community in automating computer vision tasks at human level performance, would make borehole analytics a good candidate for artificial intelligence applications. This approach becomes even more beneficial if the automated analysis includes also subsequent steps of the characterization workflow, such as porosity, connectivity, and geomechanical analysis.

We adopt deep learning supervised segmentation to segment heterogeneities in borehole images. This method involves training a Convolutional Neural Network (CNN) model with images transformed into a suitable size to be fed into the model, and a corresponding mask for each image in which pixels are labelled according to the heterogeneities. As a result, a large set of masks need to be prepared by human experts that manually label pixels on top of heterogeneities. The CNN is trained iteratively to progressively minimize the misclassification of pixels vs the ground truth mask until the maximum accuracy is obtained or a plateau is reached. Once trained the CNN model can be fed with images from a different dataset, assuming that this dataset is consistent with that used for training and infer pixel classes in new borehole images. In this process it is key to expose the network to the most complete variety of examples, which requires a large number of labelled images. For this reason, the CNN is trained using parallelized graphical processing units (GPUs) which allow increasing speed of model training.

A series of models and algorithms are also developed to preprocess images, and analyse the output of semantic segmentation to provide advisory for hydrocarbon optimal recovery. A model is developed to in-paint gaps in borehole images using a deep learning technique called generative adversarial network (GAN) [2], in such a way that the missing data are imputed prior feeding images into the semantic segmentation model. Algorithms are developed to interpolate the best sinusoidal curve that span bed boundaries and fractures, as well as polygons that include bi-dimensional shapes such as vugs and drilling induced features. Physically based algorithms are designed to estimate porosity, permeability, and connectivity related to geological heterogeneities. Physical models are also developed to provide geomechanical interpretations of the stress/strain status of the formation from the orientation and spatial distribution of fracture surfaces.

The supervised computer vision model of the present invention learns from data. It requires the manual annotation of geological and drilling related heterogeneities in many wells. This process can be time consuming and requires trained interpreters and a consistent annotation of the patterns to avoid the confusion of the model. In addition, the model requires a sufficient number of examples for each class type that needs to be identified, and different examples from different logging tools.

Otherwise, it is difficult for the model to identify unseen or under-represented patterns. A large amount of trainable data is always preferred for these algorithms to increase the likelihood of the generated models to deliver consistent results for the new examples.

BRIEF DESCRIPTION OF THE DRAWINGS

The accompanying drawings and sketches are included to provide a further understanding of the invention, and are incorporated in and constitute a part of this specification. The drawings and sketches illustrate embodiments of the invention and, together with the description, serve to explain the principles of the invention.

In the drawings:

FIG. 1 shows a computer vision pipeline for borehole images analysis;

FIG. 5 shows Sinusoids fitting module;

FIG. 7 shows primary and secondary porosity calculation from the static image and the heterogeneity mask computed though semantic segmentation.

DETAILED DESCRIPTION

Figures 2A, 2B:
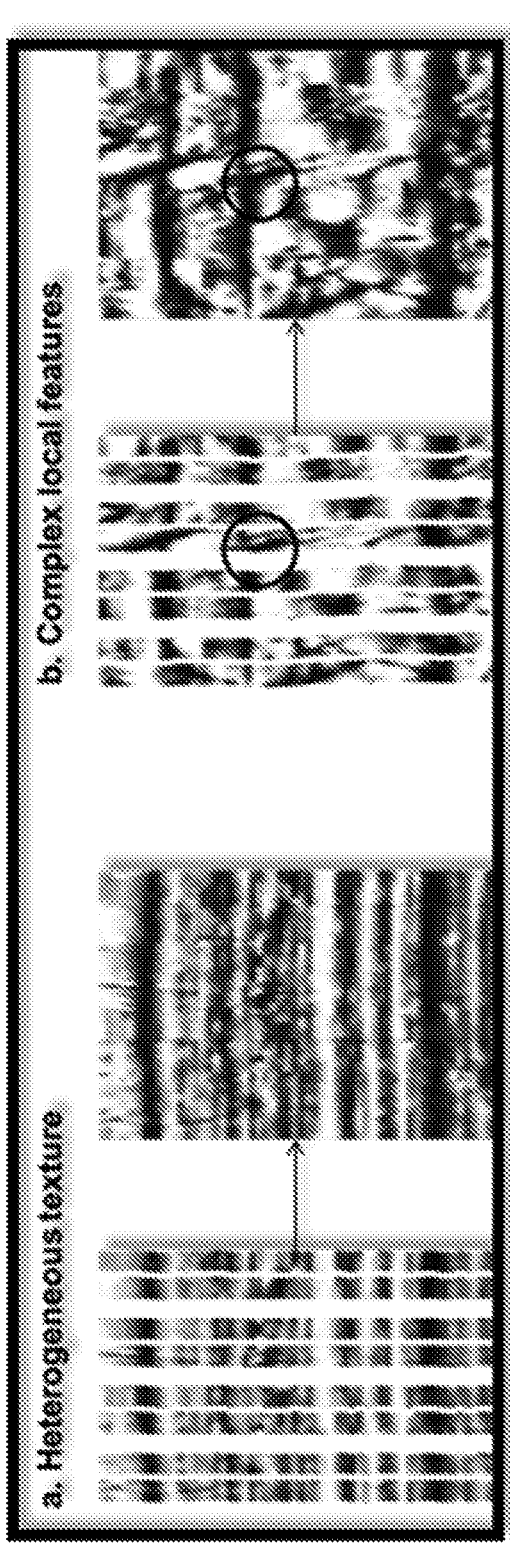
FIGS. 2A and 2B show examples of gap filling algorithm to a, highly heterogeneous image dominated by bedding planes and b, image with a relatively uniform matrix but a complex structure of intersecting features various blowout preventer rams common in the art.

The following describes the workflow to detect and characterize heterogeneities (also called features) from borehole images. The use of supervised computer vision and in particular semantic segmentation drastically increases the accuracy and the speed of the automatic detection. The invention comprises also algorithms dedicated to dip picking, stress analysis, porosity estimation from borehole images and permeability estimation from borehole images. The workflow is applicable to (1) sedimentary related heterogeneities including bedding planes, stylolites, burrows and vugs, (2) fracture related heterogeneities including faults, continuous fractures and discontinuous fracture, and (3) drilling related fractures including drilling induced, breakout and washout.

Figure 1:
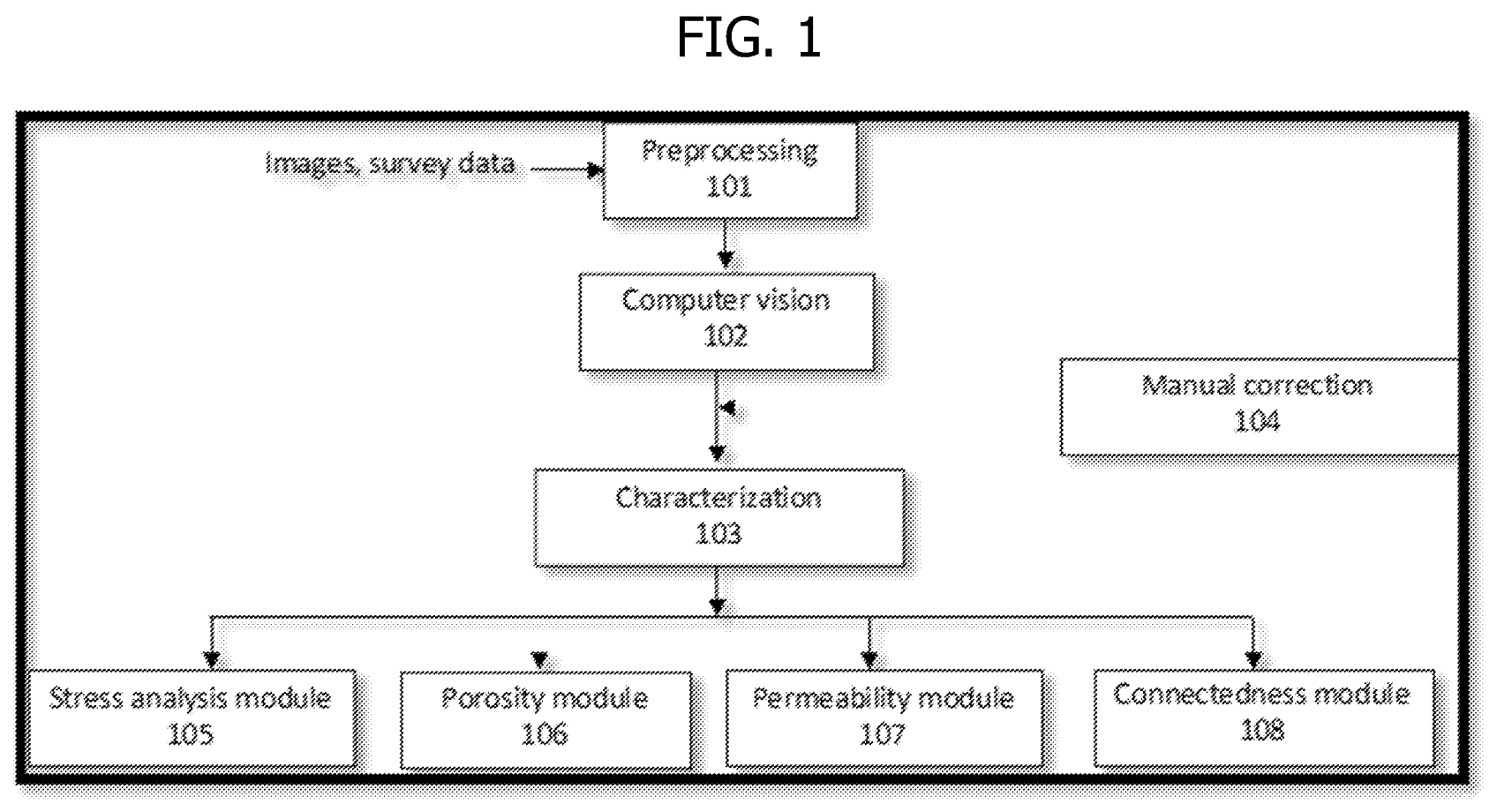

FIG. 1 illustrates one exemplary embodiment for a pipeline to detect and characterize heterogeneities from borehole images. The software pipeline includes a preprocessing module 101, a computer vision module 102, a characterization module 103, a manual correction module 104, a stress analysis module 105, a porosity module 106, a permeability module 107 and a connectedness module 108. FIG. 1 or portions of it can be implemented as software on a processor, with the whole system or part of it combined with other needed circuitry in a single physical device or in many physical devices. It can be implemented for real-time, near-real-time or offline software. The software can be used to analyze a full wellbore or a portion of it. The system is designed to take in 2D borehole images covering both oil-based and water-based muds for all types of logging irrespective of while drilling or for casing logging, process them using the pipeline and store the results on a desired location on the system, regardless when, where, or which features were detected. The invention is applicable to any type of formation whose heterogeneities can be distinguished from borehole image for all types of logging irrespective of while drilling.

Borehole Image Pre-Processing. Images need to be extracted from the full borehole representation of the well in order to be input into the CV module. In this application we extract consecutive square images of size 160 by 160 pixels that span the full width of the borehole map. However, this can be extended also to images of different aspect ratio, coverage, and relative location on the borehole map. We have developed a gap filling module based on a generative adversarial network (GAN), which is used to inpaint borehole images with gaps as described in [Sec. describing borehole images]. See I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014. The GAN model is able to model both local features and overall textural structure of a borehole image, as shown in FIGS. 2A and 2B. This represents an improvement compared to previous similar applications which make use only of a pretrained local filter [7] that are prone to produce artificial artifacts in the reconstructed image.

To train the GAN model vertical gaps are artificially created in a borehole image, while the original image without gaps is used as a target to be learned by the model. In this application we have used a total gap width equal to 40% of the total image width, and with patterns shown in FIGS. 2A and 2B that simulates those of the gaps in the borehole map. This method however can be extended to different gap width ratios and different patterns or locations across the image. FIG. 2A demonstrates that this approach is able to learn global textures in a highly heterogeneous image, as well as complex local structures as shown in of FIG. 2B. The circle in FIG. 2B highlights how the algorithm is able to reconstruct the intersection of a bedding plane and a drilling induced fracture, which is hidden by a gap in the original image.

Semantic Segmentation for Borehole Heterogeneity Extraction. We adopt a deep learning approach for automated extraction of geological heterogeneities, which has achieved state-of-the-art performance in many computer vision tasks. See Yann LeCun et al., "Deep learning," nature, 2015. The use of convolutional neural networks have become popular since the success of AlexNet on the ImageNet classification task dataset, and is motivated by the following reasons: (i) nowadays availability of large datasets and powerful computational resources, (ii) convolutional operations are translation-invariant operations which can be tuned for different sizes of field of views and enable efficient feature extraction at different scales, (iii) effective optimization algorithms such as stochastic gradient descent and Adam optimizer. See Alex Krizhevsky et al., "Imagenet classification with deep convolutional neural networks," in Advances in neural information processing systems, 2012; Jia Deng et al., "Imagenet: A large-scale hierarchical image database," in CVPR 2009., 2009. Semantic segmentation refers to algorithms for automated classification of image pixels into user defined classes for further analytics.

We use a convolutional neural network (CNN) to compute a probability map for pixels belonging to specific classes. In this application a class is defined as any of the heterogeneity in the borehole image, as defined in [Section that defines heterogeneities], however this method is applicable to any type of heterogeneities in an image. The CNN module is trained iteratively using a binary mask as a ground truth for each image, with 0 representing background and 1 pixels belonging to the class, using a loss function that penalizes the mismatch between the binary mask and the map produced by the CNN. The binary mask for the different classes is preparer according to the methodology described in paragraph [0050]. At the end of training, the CNN module infers the best probability for each pixel in the image. A class-specific threshold is defined such that pixels above the thresholds are assigned to the class, while pixels below the thresholds are assigned to the background. This results into regions that represent to the different heterogeneities in the borehole image as shown in FIGS. 3A and 3B.

Figures 3A, 3B:
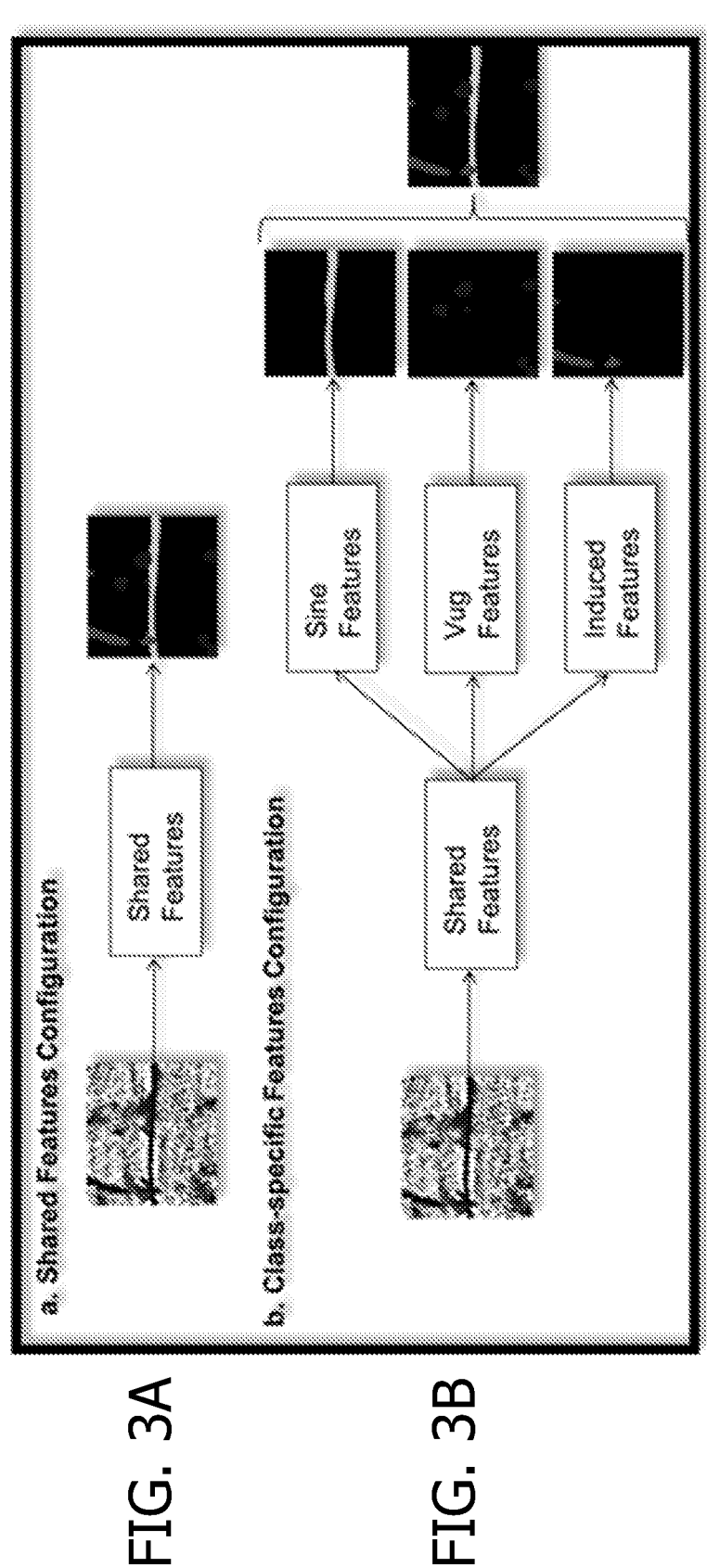
FIGS. 3A and 3B show a description of the CNN Semantic Segmentation module in two different configurations: a, multi-task shared features configuration and b, single-task class specific configuration.

We have defined two configurations of the CNN model: one based on shared features only (FIG. 3A), another with branches that produce class-specific features (FIG. 3B). The shared feature configuration produces an all-classes mask, it is easier to train, and is used as an initial option. The class-specific feature configuration produces separate binary masks for each class, which are then combined into an all-classes mask. This approach requires more training iterations, and is used to further increase the accuracy of classification when some classes are particularly difficult to be distinguished.

Geological Feature Connectivity. Connectivity of geological features is computed from the binary masks obtained from semantic segmentation in three steps. Firstly, the union U(m), and the intersection I(m) between class-specific masks are calculated. Secondly, connected regions of U(m) are extracted that encompass each intersection region in I(m). Finally, connected regions in U(m) are used to extract individual connected features from the original binary masks.

Figure 4:
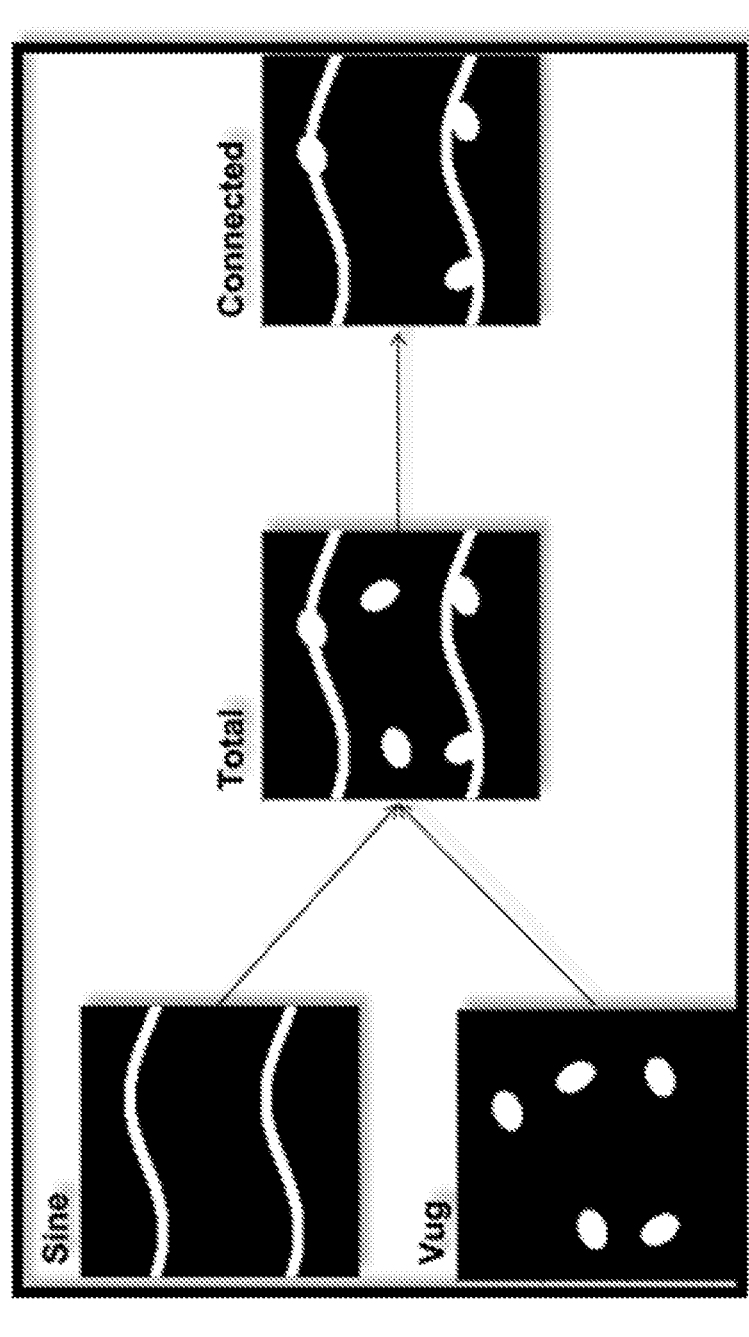
FIG. 4 shows Description of Connectivity Module: intersections between sines and vugs are used to extract connected region from the total image U(m).

FIG. 4 shows an application of this method to artificially generated sine and vug binary masks, however this method can be extended to any geological feature in the image. It is observed that only regions where vugs and sines intersect with each other are extracted. The algorithm produces for each connected region: the position of the centroid, the number and types of connected features, and the total number of pixels in the region.

Sinusoids Fitting Pipeline. The characterization module 103 accepts binary images of the cited heterogeneities and performs a series of transformations and algorithms to extract apparent dipset, apparent azimuth, length, width, area and type of the features given the hole diameter (bit size or caliper logs). A dip converter (Moran et al, 1962 and US1987/4962490) is then used to extract true dip and true azimuth given wellbore survey data. The binary images are processed with 2 algorithms depending on the shape of feature apparent in borehole images: (1) sinusoids fitting for bedding planes, stylolite, burrows, continuous fractures and discontinuous fractures and (2) polygon for faults, vugs, drilling induced, breakout and washout.

Figure 5:
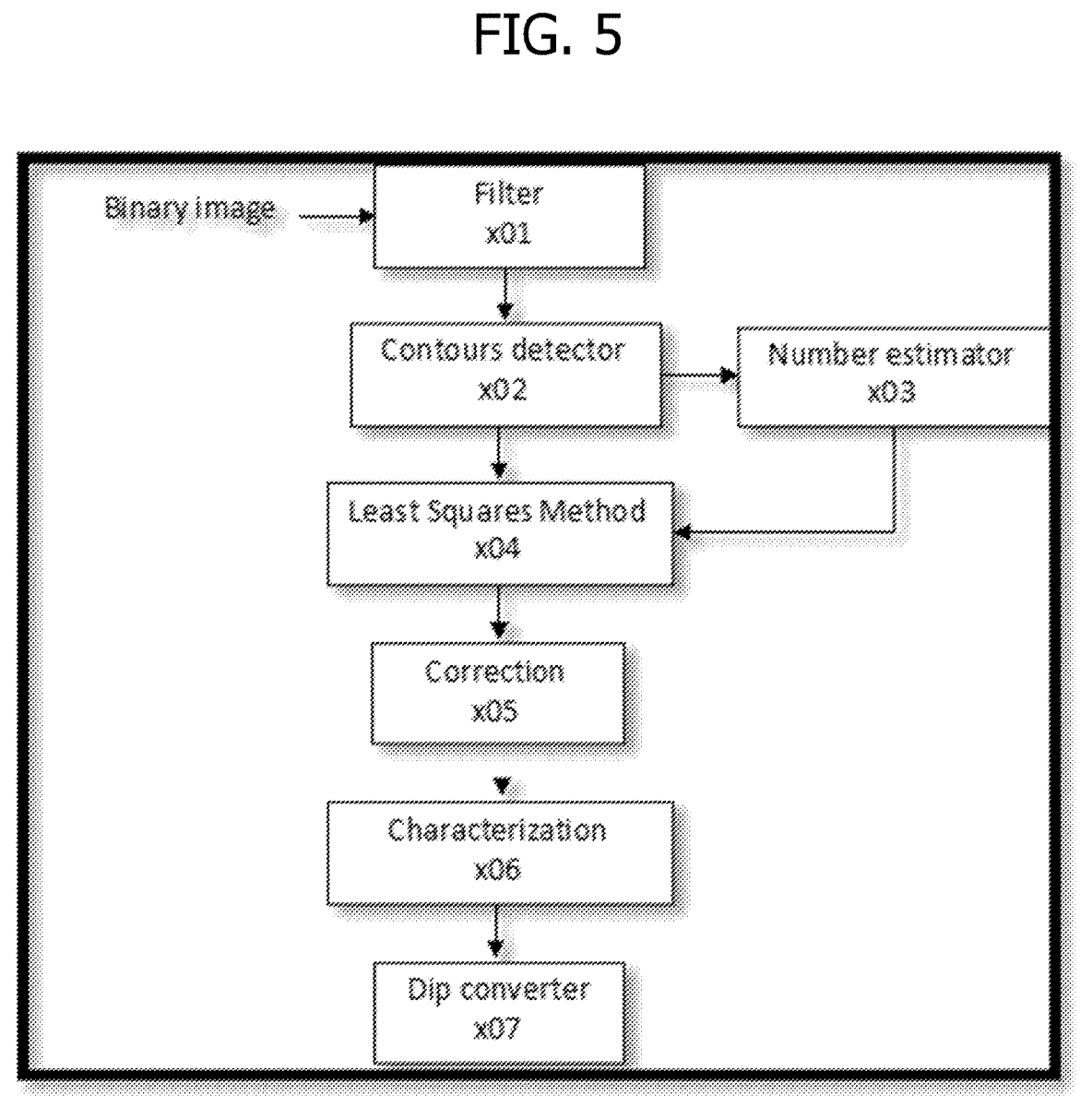

Bedding planes, stylolites, burrows and fractures look like sinusoids or fragment of sinusoids on borehole images. Each feature is characterized by an offset (depth), an amplitude and a phase (US1987/4962490). FIG. 5 illustrates one exemplary embodiment for a pipeline used to fit sinusoids parameters. The pipeline takes as an input the binary image of the wellbore or a portion of it. The binary image is representing geological or drilling related features having sinusoidal forms.

A filter x01 is used to detect connected region, eliminates regions based on their widths and heights. Small regions are removed given a threshold. For each region, the number of sinusoids is estimated using module x03. If a void exists within the region, two sinusoids are considered, else only one sinusoid is considered. This voting system is different from US2017/0372490 where a Hough voting system is used to filter and identify the number of sinusoids. A contours detector x02 is used to detect the upper and the bottom contours of each connected region.

Least Squares Method x04 is then used to fit a sinusoid based on the contour (x, y) coordinates, and this for the upper and the lower contour of the considered region connected or disconnected. The fitting allows the estimation of the offset y, the amplitude A and the phase $\psi$. If the amplitude A is negative, the amplitude A is replaced by its absolute value and $\pi$ is added to the phase $\psi$. The phase is corrected to be within the range $[0, 2\pi]$. A score is calculated for each sinusoid using pixel values of the borehole image raw or transformed.

If only one sinusoid is identified by x03, the sinusoid with the best score is chosen. The depth of the chosen sinusoid is shifted into the middle of the region connected or disconnected. If 2 sinusoids are identified by x03, the upper and lower sinusoids are considered. Each offset of the two sinusoids is corrected taking into account the void inside the region.

Least Square Method x04 implementation can be linear or nonlinear. This method differs from US2017/0372490 where a Hough voting system is used to fit the sinusoids parameters. In addition, US2017/0372490 uses a sliding window to look for sinusoids. Whereas our invention can analyze the full wellbore or a portion of it using regions identified from the binary image. The characterization module x06 is used to calculate apparent dip $\theta_{app}$ and apparent azimuth $\varphi_{app}$ for each sinusoid based on each couple (A, $\psi$) and the hole diameter d using the following equations:

$$\theta_{app} = \tan^{-1} \frac{A}{0.5 * d} \text{ and}$$

$$\varphi_{app} = \frac{\pi}{2} - \psi.$$

These equations are similar to US1999/5970371. A dip converter x07 is then used to calculate true dip $\theta_{true}$ and true azimuth $\varphi_{true}$ given apparent dip $\theta_{app}$, apparent azimuth $\varphi_{app}$, well deviation $\delta$ and well azimuth $\alpha$ as in (Moran et al, 1962 and US 1987/4962490).

Polygons Fitting Pipeline. Heterogeneities including faults, vugs, drilling induced, breakouts and washout can have a random or a regular shape when observed on borehole images. This invention claims that closed polygons are used to identify these features based on the binary images of each heterogeneity.

Figure 6:
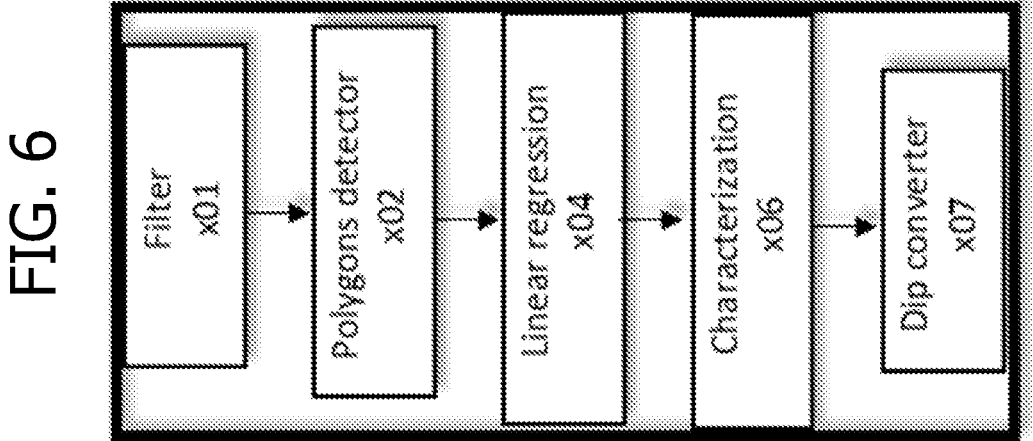
FIG. 6 shows polygons fitting module.

FIG. 6 illustrates one exemplary embodiment for a pipeline to detect and characterize heterogeneities represented by polygons. The pipeline takes as input the binary image of a given feature (faults, vugs, drilling induced, breakouts and washout) for the hole wellbore or a portion of it. A detector x02 is used to detect each connected region in the binary image. A contour algorithm is used to fit the polygon surrounding each region. A filter x01 is used to remove region with small number of pixels given a threshold. A characterization module x06 is used to determine for each connected region the offset y, the apparent dip $\theta_{app}$, the apparent azimuth $\varphi_{app}$, the height h, the width w, the area S and the type. Module x06 treats the image as a n*m two dimensional array where n is the number of rows and j is the number of columns. Each pixel is characterized by its indices (i, j) where i∈[0, n−1] is the row number and j∈[0, m−1] is the column number.

First the center of each region coordinates (i, j) are calculated as the gravity center of the connected object. Pixel values of the pixels of the same connected object can be used as a weight to determine the gravity center coordinates. Apparent azimuth $\varphi_{app}$ is calculated as a function of the center j coordinate:

$$\varphi_{app} = \frac{j}{m-1} * 2\pi.$$

In order to calculate the apparent dip $\theta_{app}$, linear regression is used to calculate the intercept b and the slope a of the line crossing the connected object of equation y=a*x+b.

First, pixels coordinates of the connected object are converted into length coordinates (x, y) from the depth depth array associated to the image and the borehole diameter: x=depth[i] and $$y = \frac{j}{m-1} * \pi * d.$$

Then any unsupervised method like PCA or and supervised method like Linear Regression can be used to fit the line parameters a and b. Pixels values of the connected region can be used to weight the regression. Apparent dip $\theta_{app}$ is calculated using the following equation:

$$\theta_{app} = \frac{\pi}{2} - \tan^{-1} a.$$

The height h, the width w and the area S of each connected object are derived from the length coordinates (x, y) of each object pixels. A special pipeline is used to process faults.

A dip converter x07 is then used to calculate true dip $\theta_{true}$ and true azimuth $\varphi_{true}$ given apparent dip $\theta_{app}$, apparent azimuth $\varphi_{app}$, well deviation $\delta$ and well azimuth $\alpha$ as in (Moran et al, 1962 and US1987/4962490).

The above pipeline is applicable to heterogeneities including faults, vugs, drilling induced, breakouts and washout can have a random or a regular shape when observed on borehole images. In particular, the characterization of vugs contains an additional step to characterize vugs into two subclasses: 'isolated-vug', 'connected-vug'. The characterization module x06 takes as input binary image of vugs, binary images of sedimentary related features and binary images of fracture related features.

A for loop or equivalent is used to determine the intersection of each connected region in the vugs binary image with the other sedimentary/fractures related features. If the intersection is empty, the vug is considered as isolated, otherwise it is considered as connected. In addition, the characterization might indicate to which kind of feature each vug is connected like 'connected-vug-fracture', 'connected-vug-bedding' etc.

The pipeline considers also the situation where the binary image of vugs only is available in addition to offset, apparent dip and apparent azimuth of sinusoidal appearance features including bedding planes, stylolites, burrows and fractures. In this situation, idealized binary images of sinusoidal appearance features including bedding planes, stylolites, burrows and fractures are derived by plotting each sinusoid defined by its offset depth y, amplitude A and phase $\psi$. Amplitude A and phase $\psi$ expressions are derived from:

$$A = 0.5 * d * \tan \theta_{app} \text{ and } \psi = \frac{\pi}{2} - \varphi_{app}.$$

Manual Interpretation Module. A manual interpretation module 104 is used to correct the automatic detection. In particular it allows manual picking of sinusoid shaped features including bedding planes, stylolites, burrows connected fractures and discontinuous fractures and polygons. In addition, this module is used as an annotator the manually label geological features on borehole images and use the corresponding mask to train new models or retrain existing models to increase the accuracy of the automatic detection.

The pipeline of the annotation mode consists on selecting a borehole image, manually select polygon points using the mouse and then validate the selected polygon. The type of the feature being picked can be specified in the beginning or at the end of the process.

Stress analysis Module. A stress analysis module 105 is used to determine orientation and magnitudes of principle stresses and the stresses applied on bedding planes, stylolites, burrows, continuous fractures, discontinuous fractures and faults or any other geological or drilling related features given their true dip and true azimuth. In particular, the distribution of true azimuth of drilling induced heterogeneities allows the identification of the minimum horizontal stress direction and the distribution of true azimuth of breakouts allows the calculation of the maximum horizontal stress orientation. If one of these drilling related features is absent, the other principle stress orientation is deduced from the known one since they are always orthogonal.

In addition to this method, other stress analysis modules are implemented in the software. The module P-B-T axes method calculates compression and extension axes which lie in the plane containing the glide plane normal and the glide direction. See Turner, F. J. (1953). Nature and dynamic interpretation of deformation lamellae in calcite of three marbles. American Journal of Science, 251(4), 276-298. The P-T axes are plotted in an equal area, lower hemisphere stereonet. The B axis is determined perpendicular to the vector mean of the P and T axes.

The module Extended dihedra method of Lisle calculates the likelihood that a given direction (X) is identical with sigme1. See Lisle, R. J. (1988). ROMSA: a BASIC program for paleostress analysis using fault-striation data. Computers & Geosciences, 14(2), 255-259. First, P1 is calculated as the percentage of faults for which X lies in the sigme1 dihedra. Then directions (Z) perpendicular to X are checked as candidates for sigme3. The interval between these directions is user-defined. For each orientation of Z two likelihoods are determined:

a. P2: percentage of faults with Z in the sigma 3 dihedra.
    b. P3: percentage of faults which fulfill constraint.
    c. Z (sigme3) is the direction which maximizes the product P2×P3.
    d. Finally, the total likelihood Ptotal=P1×P2×P3 is calculated.

The module Numerical dynamic analysis calculates the principal stress directions and the stress ratio from plane-lineation-glide sense data. See Spang, J. H. (1972). Numerical method for dynamic analysis of calcite twin lamellae. Geological Society of America Bulletin, 83(2), 467-472. For each data set the best fitting compression resp. extension axis is determined. The axes lie in the plane which contains the glide plane normal and the glide direction. Axes orientations are transformed into second order tensors. Addition of all tensors and division by the number of data sets yields the bulk stress tensor.

The angle between the calculated direction of maximum shear stress and the observed glide direction is determined for each glide plane.

The module Direct inversion calculates the principal stress directions and the stress ratio from plane-lineation-glide sense data by using a least-squares minimization on the angles between the calculated and the observed glide direction. See Angelier, J. (1979). Determination of the mean principal directions of stresses for a given fault population. Tectonophysics, 56(3-4), T17-T26. The angle between the calculated direction of maximum shear stress and the observed glide direction is determined for each glide plane.

The module Dynamic cluster Analysis separates a heterogeneous set of orientation data (HUANG) using the following pipeline: (1) Visualize heterogeneous orientation data in a stereographic projection to be separated into subsets; (2) Count a number of subsets, which can be defined by visual inspection; (3) Estimate the mean orientation of each subset; (4) Assign each orientation to the subset closest to it by using the smallest angle between the mean orientation and the particular orientation; (5) After inspection of the cluster try another iteration with a better nuclei. See Huang, Q., & Charlesworth, H. (1989). A FORTRAN-77 program to separate a heterogeneous set of orientations into subsets. Computers & Geosciences, 15(1), 1-7.

Image Porosity Module. We use a borehole static image with pixel values normalized between 0 and 1 across the full well to calculate the contribution of matrix and heterogeneities to the total porosity. Primary porosity refers to the porosity related to the matrix, while secondary porosity is related to all the heterogeneity regions extracted through the semantic segmentation module. For each row in the static image, pixels are classified as "heterogeneity" if they belong to a heterogeneity region, otherwise they are classified as "matrix". The primary and secondary porosity in the row are calculated as the sum of pixel values in the static image that belong respectively to matrix and heterogeneity, normalized by the total number of pixels in the row.

Figure 7:
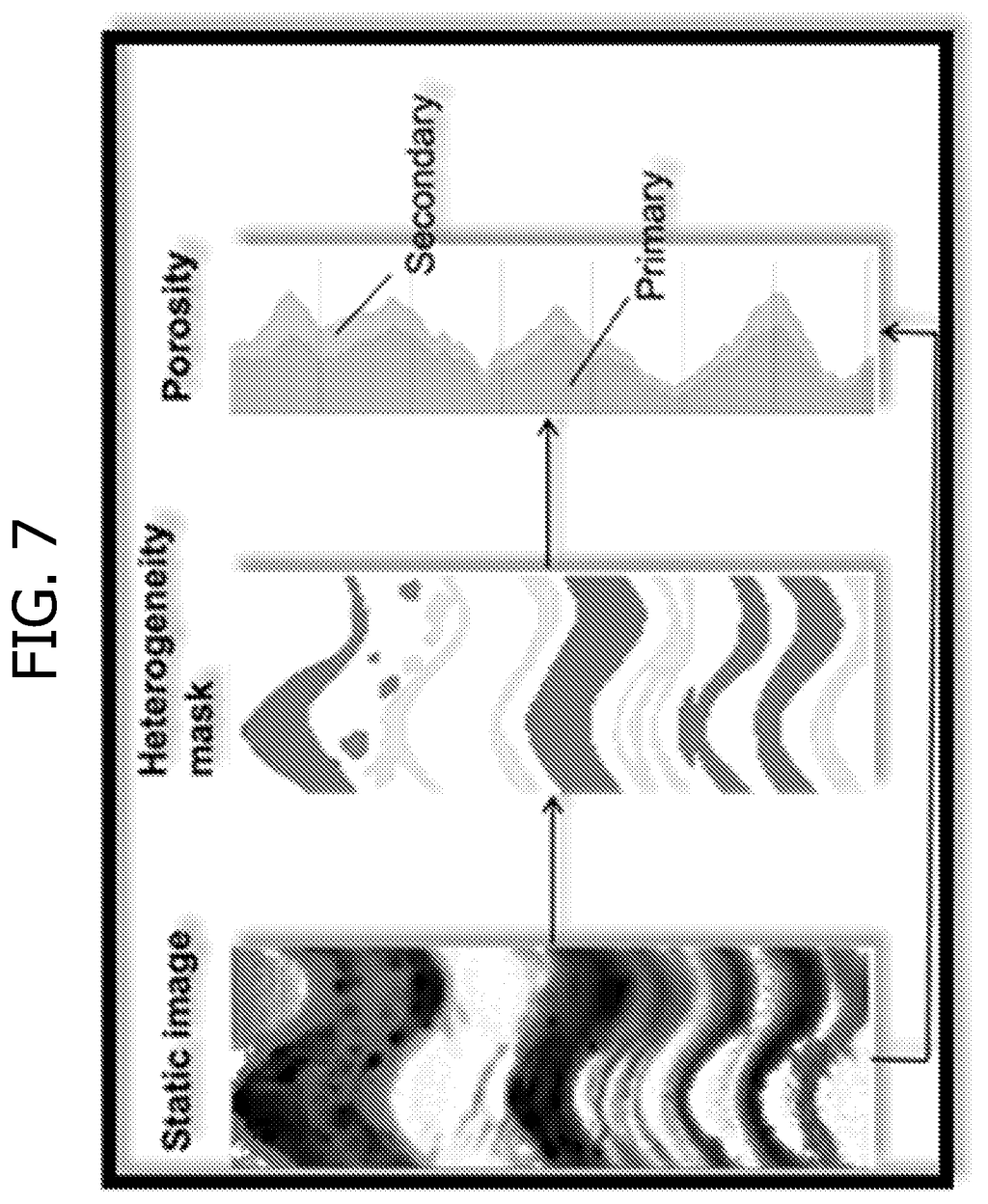

The result is the porosity vs. depth plot shown on the right of FIG. 7, in which the secondary porosity is stacked on top of the primary porosity to better highlight its relative contribution. Since there can be large porosity variation between consecutive rows, the results are presented in terms of a moving average. In this application we have used a window span of 1 ft, although this can be changed depending on the length scale of heterogeneities in the borehole images.

Image Permeability Module. A permeability calculation pipeline 107 is used to estimate a normalized permeability along the wellbore using borehole image and features map. First, all the heterogeneities including natural and drilling related features pixels values in the wellbore image are replaced by not a number marker (−9999, None, nan . . . ). Then, the invention Gap filling module is used to impute missing values. Also, Geostatistics algorithms can be used for this kind of imputation. The goal is to replace all the heterogeneities by the matrix. This is different from gap filling methods used to fill the gaps caused by the pads' positions in some logging tools.

The imputed borehole image is created, a sliding window with a given overlap is used to calculate the permeability along the wellbore. Each sliding window is transformed into a normalized permeability region. The normalized permeability of each pixel is calculated from the pixel value. The pixels with value 0 are given the highest permeability 1. The whitest pixel 255 is given the lowest permeability 0. An exponential or a linear law or any similar low is used to calculate the permeability values for pixels in [0, 255]. The permeability pipeline is applicable for 2D array with real values. A Darcy experiment is then simulated using finite element method to calculate vertical and horizontal normalized permeabilities using different sets of boundary conditions. The normalized permeability is calibrated based on core data from the same well or from permeability measurements of offset wells.

While selected embodiments have been selected to be illustrated of the present invention, and specific examples have been described herein, it will be obvious to those skilled in the art that various changes and modifications may be aimed to in the specification. It will, therefore, be understood by those skilled in the art that the particular embodiments of the invention presented here are by way of illustration only, and are not meant to be in any way restrictive; therefore, numerous changes and modifications may be made, and the full use of equivalents resorted to, without departing from the spirit or scope of the invention.

What is claimed is:

1. A system comprising: a computer vision processor configured to receive at least one representation of a borehole and survey data corresponding thereto; and a memory storing processor-executable modules that, when executed by the processor, detect and characterize one or more heterogeneities from the representation of the borehole, the processor-executable modules comprising:

a preprocessing module configured to extract a plurality of borehole images from the representation of the borehole, the extracted borehole images spanning a width of the borehole, wherein the preprocessing module includes a gap filling module configured to inpaint gaps in the borehole images;

a computer vision module configured to perform semantic segmentation for automated classification of pixels in the borehole images to identify the heterogeneities; and a characterization module configured to execute a fitting algorithm for extracting dimensional information of the identified heterogeneities, wherein the fitting algorithm executed by the characterization module comprises a sinusoids fitting and a polygon fitting.

2. The system as set forth in claim 1, wherein the computer vision module comprises a convolutional neural network configured to compute a probability map for pixels belonging to one or more specific classes.

3. The system as set forth in claim 1, wherein the gap filling module comprises a machine learning model trained to model at least one of local features and overall textural structure of the borehole images.

4. The system as set forth in claim 1, further comprising a manual correction module configured to improve automated detection by the computer vision module.

5. The system as set forth in claim 4, wherein the computer vision module comprises a trained machine learning model and wherein the manual correction module is further configured to annotate one or more features in borehole images for retraining the model of the computer vision module.

6. The system as set forth in claim 1, wherein the processor-executable modules comprise one or more of a stress analysis module configured to determine orientation and magnitudes of stresses applied on the identified heterogeneities; a porosity module calculate a contribution of matrix and heterogeneities to total porosity; a permeability module configured to estimate a normalized permeability along a wellbore using the borehole images; and a connectedness module configured to extract individual connected features from the identified heterogeneities.

7. The system as set forth in claim 1, wherein the identified heterogeneities comprise one or more of the following: sedimentary related heterogeneities including bedding planes, stylolites, burrows, and vugs; fracture related heterogeneities including faults, continuous fractures, and discontinuous fracture; and drilling related fractures including drilling induced, breakout, and washout.

8. A method of detecting and characterizing one or more heterogeneities from a representation of a borehole, the method comprising:

receiving at least one representation of a borehole and survey data corresponding thereto;

extracting a plurality of borehole images from the representation of the borehole, the extracted borehole images spanning a width of the borehole;

inpainting gaps in the borehole images;

performing semantic segmentation for automated classification of pixels in the borehole images to identify the heterogeneities; and executing a fitting algorithm for extracting dimensional information of the identified heterogeneities, wherein the fitting algorithm includes both a sinusoids fitting and a polygon fitting.

9. The method as set forth in claim 8, executing a convolutional neural network configured to compute a probability map for pixels belonging to one or more specific classes.

10. The method as set forth in claim 8, inpainting the gaps comprises executing a machine learning model trained to model at least one of local features and overall textural structure of the borehole images.

11. The method as set forth in claim 8, further comprising manually correcting the identified heterogeneities to improve automated detection thereof by a computer vision module.

12. The method as set forth in claim 11, wherein manually correcting comprises annotating one or more features in borehole images for retraining the computer vision module.

13. The method as set forth in claim 8, further comprising one or more of determining orientation and magnitudes of stresses applied on the identified heterogeneities; calculating a contribution of matrix and heterogeneities to total porosity; estimating a normalized permeability along a wellbore using the borehole images; and extracting individual connected features from the identified heterogeneities.

14. The method as set forth in claim 8, wherein the identified heterogeneities comprise one or more of the following: sedimentary related heterogeneities including bedding planes, stylolites, burrows, and vugs; fracture related heterogeneities including faults, continuous fractures, and discontinuous fracture; and drilling related fractures including drilling induced, breakout, and washout.

15. One or more tangible computer-readable media comprising:

a plurality of processor-executable modules that, when executed by a processor, detect and characterize one or more heterogeneities from the representation of the borehole, the processor-executable modules comprising:

a preprocessing module configured to extract a plurality of borehole images from the representation of the borehole, the extracted borehole images spanning a width of the borehole, wherein the preprocessing module includes a gap filling module configured to inpaint gaps in the borehole images;

a computer vision module configured to perform semantic segmentation for automated classification of pixels in the borehole images to identify the heterogeneities; and a characterization module configured to execute a fitting algorithm for extracting dimensional information of the identified heterogeneities, wherein the fitting algorithm executed by the characterization module comprises a sinusoids fitting and a polygon fitting.

16. The computer-readable media as set forth in claim 15, wherein the processor-executable modules comprise one or more of a stress analysis module configured to determine orientation and magnitudes of stresses applied on the identified heterogeneities; a porosity module calculate a contribution of matrix and heterogeneities to total porosity; a permeability module configured to estimate a normalized permeability along a wellbore using the borehole images; and a connectedness module configured to extract individual connected features from the identified heterogeneities.

* * * * *